Oct. 4, 1949.    S. K. LOCKWOOD ET AL    2,483,470
FISH CLEANING APPARATUS
Filed May 6, 1946
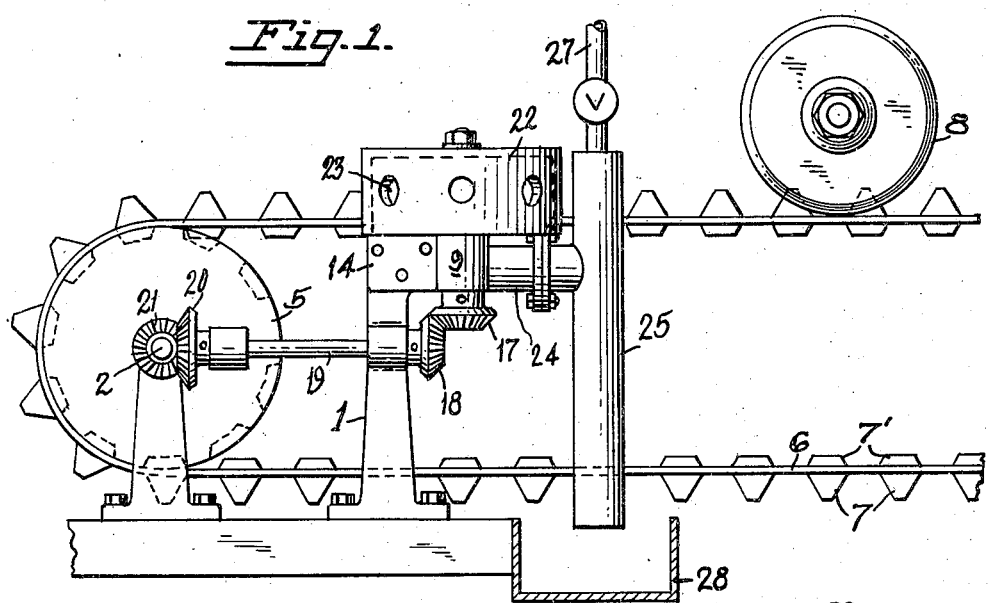
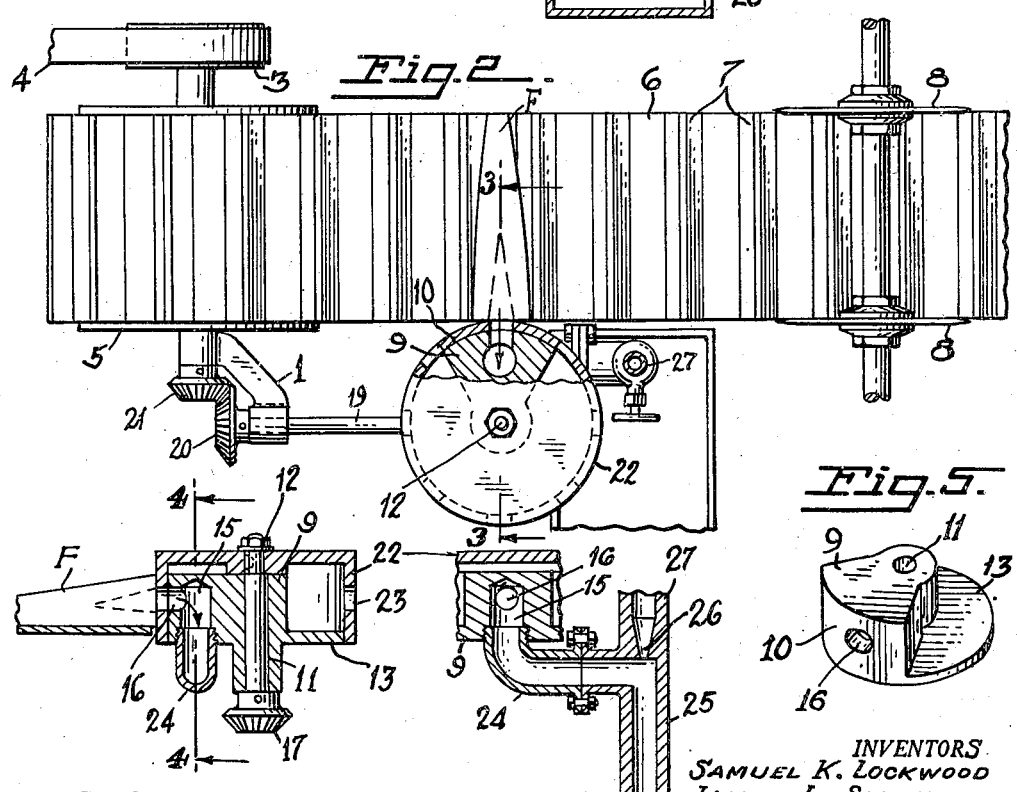
INVENTORS
SAMUEL K. LOCKWOOD
JAMES L. SMITH
BY
J. E. Trabucco
ATTORNEY.

Patented Oct. 4, 1949

2,483,470

UNITED STATES PATENT OFFICE 2,483,470

FISH CLEANING APPARATUS

Samuel K. Lockwood, Carmel, and James L. Smith, Pacific Grove, Calif.

Application May 6, 1946, Serial No. 667,666

7 Claims. (Cl. 17—3)

This invention relates to improvements in fish cleaning apparatus.

An object of our invention is to provide fish cleaning apparatus embodying novel means for removing the entrails from a number of fish.

Another object of our invention is to provide fish cleaning apparatus embodying an arrangement whereby a number of fish having their heads and tails removed are successively conveyed into operative relation with a novel suction device which draws the entrails therefrom.

Other and further objects of our invention will become apparent to those skilled in the art or will be specifically pointed out in the description to follow. It is to be understood, however, that the embodiment of our invention herein shown and described is intended for illustrative purposes only and that it is not to be construed as limiting the scope of the invention in the art.

In the accompanying drawings:

Fig. 1 is a side elevation of fish cleaning apparatus embodying the principles of our invention;

Fig. 2 is a top plan view of the apparatus, showing parts broken away and in section;

Fig. 3 is a sectional view taken on the line 3—3 of Fig. 2;

Fig. 4 is a sectional view taken on the line 4—4 of Fig. 3; and

Fig. 5 is a perspective view of the stationary member.

Referring to the drawings the numeral 1 designates a suitable supporting structure having a drive shaft 2 journaled thereon. The drive shaft is rotated in a counter-clockwise direction as viewed in Fig. 1 through a pulley 3 and a belt 4 connected to a suitable source of power. A drum 5 keyed to the drive shaft 2 operatively engages with an endless fish conveyor 6, provided with a plurality of uniformly spaced transverse cleats 7 which form pockets for maintaining the fish carried by the conveyor in spaced relation. While the conveyor 6 is shown as having spaced inwardly disposed transverse cleats 7' engaging with transverse grooves on the outer surface of the drum, it is to be understood that other suitable means may be provided for operatively connecting the fish conveyor to the drive shaft, such as a sprocket wheel and chain drive arrangement.

A number of fish positioned on the endless conveyor 6 with their heads and tails protruding from the lateral edges of the latter are carried into engagement with two rotating circular knives 8. As the fish are successively engaged by the knives, their heads and tails are severed, thus preparing them for subsequent engagement with the entrail removing apparatus constituting our invention.

Mounted on the supporting structure 1 is a stationary shoe or member 9 having an arcuate bearing surface 10 at one side and a vertical opening 11 through which a shaft 12 rotatably extends. The stationary member 9 is formed with a horizontally disposed circular flange 13 and a laterally extending part 14, the latter being secured as by screws or bolts to the supporting structure 1. The stationary member 9 is provided with a large vertical opening 15 having an outwardly disposed extension 16 of somewhat smaller diameter; the latter terminating at the arcuate bearing surface 10. The lower end of the vertical shaft 12 is secured to a bevel gear 17 which is meshed with a similar gear 18 carried at one end of a short shaft 19. The shaft 19 is connected by bevel gears 20 and 21 to the drive shaft 2. Other connecting means may be employed to effect the transmittal of rotary motion from the drive shaft 2 to the vertical shaft 12.

Suitably secured as by key means to the upper end of the vertical shaft 12 is an inverted cup shaped valve member 22 which extends over the stationary member 9 and is arranged with its inner circumferential surface slidably engaging with the arcuate bearing surface 10 of the stationary member. The valve member is provided with a plurality of peripheral openings 23 which are circularly arranged in uniformly spaced relation. The openings 23 are preferably of circular shape, and each is substantially of the same diameter as the opening 16.

The valve member 22 and the endless conveyor 6 are so tangentially arranged that the fish are successively carried into engagement with the outer circumferential surface of the valve member. The relative speeds at which the endless conveyor 6 travels and the valve member 22 rotates are such that the fish will be successively conveyed to a point directly opposite the opening 16 in the stationary member 9 at the same time an opening 23 in the valve member completely registers with the said opening 16. Connected to the vertical opening 15 in the stationary member 9 as by suitable threaded means formed on the stationary member 9, is a tubular conduit 24 which connects with a suction tube 25 having a restricted inlet opening 26 or nozzle arranged centrally above the point where the conduit 24 is connected. The inlet opening 26 is connected to a water supply pipe 27 which delivers water thereto from a suitable source under a pressure capable of creating a vacuum below the point where the conduit joins the suction tube 25. While any other suitable means may be employed to create a suction in the tubular conduit 24, it has been found that where a number of similar units are to be operated at the same time, the use of water delivered under pump pressure to the suction tube or tubes is a most economical and satisfactory method.

A partial vacuum created in the conduit 24 by the discharge of a high velocity stream of water into and through the suction tube 25 will cause a suction to be set up in the openings 15 and 16 of the stationary member 9. When the valve member 22 is in a position where its openings 23 are not in registry with the opening 16 of the stationary member 9, a vacuum is being built up preparatory to the application of suction to the inside of a fish. An opening 23 in the valve member 22 commences to register with the opening 16 in the stationary member 9 at about the same time the larger or head end of a fish F first begins to contact the valve member, and as the conveyor continues to convey the fish forwardly and the valve member continues its rotation, the openings 23 and 16 gradually register and simultaneously extend over a gradually increasing area of the fish's large end. A suction is initially applied to the fish when the openings 23 and 16 first begin to register, and such suction continues to hold the fish in firm engagement with the valve member during the period when said openings are in partial and full registration with one another. Since the entrails of a fish are exposed at its large end after its head is severed, the suction applied when the openings 16 and 23 are in partial and full registry will draw said entrails from the fish into the openings 16 and 15 and out through the conduit 24. The entrails are drawn into the suction tube 25 and discharged therefrom into a receptacle or trough 28.

What we claim is:

1. In fish cleaning apparatus, a stationary member having a channel extending therethrough, a rotatable element extending around the stationary member and having a plurality of circularly arranged spaced openings arranged for successive registration with one end of the channel of the stationary member, a conveyor for successively bringing fish having their heads severed into engagement with the rotatable element, the conveyor and the rotatable element being synchronized so that fish are successively conveyed into a position with their cut ends positioned opposite an opening in the element at a time when the opening is in registry with the channel in the stationary member, and means for applying suction to the channel, whereby the entrails of the fish may be withdrawn therefrom and through the channel.

2. In fish cleaning apparatus, a stationary member having an arcuate bearing surface at one side and a channel extending therethrough with one end thereof opening at the bearing surface, a rotatable element extending around the stationary member in engagement with the bearing surface and having a plurality of uniformly spaced openings circularly arranged for successive registration with the channel as the element is rotated, a conveyor for successively conveying a number of fish, having their heads severed and their cut ends exposed into engagement with the rotatable element, the conveyor and the rotatable element being synchronized so that fish are successively conveyed into a position with their cut ends positioned opposite an opening in the element at a time when the opening is in registry with the channel in the stationary member, and means for applying suction to the channel, whereby the entrails of each fish may be withdrawn therefrom as it reaches a position opposite the channel.

3. In fish cleaning apparatus, a stationary member having an arcuate bearing surface at one side and a channel extending therethrough, with its inlet end positioned at the bearing surface, a rotatable element extending around the stationary member in engagement with the bearing surface and having a plurality of uniformally spaced openings circularly arranged for successive registration with the inlet of the channel as the element is rotated, a conveyor for successively conveying fish having their heads severed and their cut ends exposed into engagement with the rotatable element, the conveyor and the rotatable element being synchronized so that fish are successively conveyed into a position with their exposed cut ends positioned opposite an opening in the element at a time when the opening is in registry with the inlet of the channel in the stationary member, and means for applying suction to the outlet end of the channel, whereby when a fish reaches a position opposite the inlet of the channel the entrails may be withdrawn therefrom.

4. In fish cleaning apparatus, a stationary member having a bearing surface at one side and a channel extending therethrough with its inlet end located at the bearing surface, the said channel having an inlet and an outlet, a movable valve element positioned externally of and in engagement with the bearing surface of the stationary member and arranged to alternately close and open the inlet of the channel, a fish conveyor for successively conveying a number of fish having their heads severed and their cut ends exposed into engagement with the movable valve element, the conveyor and the valve element being synchronized so that fish are successively conveyed into a position with their exposed cut ends positioned opposite the inlet of the channel at a time when the valve element has opened the inlet of the channel, and means for applying suction to the outlet of the channel, whereby when a fish becomes positioned opposite the inlet of the channel its entrails may be withdrawn therefrom.

5. In fish cleaning apparatus, a stationary member having a channel therethrough, one end of the channel constituting an inlet and its opposite end an outlet, a fish conveyor arranged to deliver a number of fish having their heads severed and their cut ends exposed successively to a position where their cut ends are opposite and near the inlet of the channel, a continuously rotatable valve member arranged in operative relation with respect to the inlet of the channel and having a series of circularly arranged spaced openings adapted to successively register with the inlet of the stationary member as the said valve member rotates, the said valve member and the fish conveyor being synchronized so a fish reaches a position opposite the inlet opening of the channel at a time when the valve member has opened the said inlet, and means for applying a suction to the outlet end of the channel, whereby the entrails of a fish when positioned opposite the inlet opening of the channel will be drawn therefrom.

6. In fish cleaning apparatus, a stationary member having a channel extending therethrough, one end of the channel constituting an inlet and its opposite end an outlet, a fish conveyor arranged to successively deliver a number of fish having their heads severed and their cut ends exposed to a position directly opposite and near the inlet of the channel, a valve member movably positioned to extend between the inlet of the channel and the cut end of a fish as the latter is being conveyed to a position opposite the inlet, the valve member being arranged to engage with the cut end of a fish as the conveyor carries it to a position opposite the inlet of the channel, and the said valve member being also arranged to uncover the said inlet at a time when the fish reaches a position opposite said inlet, and suction applying means connected to the outlet of the channel for drawing the entrails from a fish when the latter reaches a position opposite the opened inlet end of the channel.

7. In fish cleaning apparatus, a stationary member having a bearing surface at one side and a channel extending therethrough from the bearing surface to another side, the said channel having an inlet and outlet, a rotatable inverted cup-shaped valve member and extending over the stationary member having a plurality of spaced openings arranged to successively register with the inlet of the channel as the said valve member rotates, a fish conveyor for a number of fish having their heads severed and their cut ends exposed, the said fish conveyor being arranged in substantially tangential relation to the valve member whereby the fish may be successively brought with their cut ends into engagement with the valve member as it rotates, the conveyor and the rotatable valve member being synchronized so that fish are successively conveyed into a position with their cut ends positioned opposite an opening in the valve member at a time when the opening is in registry with the inlet of the channel of the stationary member, and suction applying means connected to the channel for drawing the entrails from a fish when the latter reaches a position opposite the inlet opening of the channel.

SAMUEL K. LOCKWOOD.
JAMES L. SMITH.

REFERENCES CITED

The following references are of record in the file of this patent:

UNITED STATES PATENTS

| Number | Name | Date |
|---|---|---|
| 387,008 | Perry | July 31, 1888 |
| 2,192,838 | McGrew | Mar. 5, 1940 |
| 2,326,146 | Kurzbin | Aug. 10, 1943 |